United States Patent [19]

Hickson

[11] Patent Number: 4,481,562
[45] Date of Patent: Nov. 6, 1984

[54] SOLAR POWER STATION

[75] Inventor: Alan D. Hickson, Detroit, Mich.

[73] Assignee: T & L Electronics, Inc., Dearborn Heights, Mich.

[21] Appl. No.: 479,825

[22] Filed: Mar. 28, 1983

[51] Int. Cl.³ .................. F21L 7/00; H01L 31/00
[52] U.S. Cl. .................... 362/183; 136/244; 136/291; 362/157; 362/190; 429/9; 40/902; 340/811
[58] Field of Search .............. 136/244, 291; 320/2, 320/61; 362/157, 183, 190; 429/9; 40/902; 340/811

[56] References Cited

U.S. PATENT DOCUMENTS

| D. 136,799 | 12/1943 | Vendope | D26/64 |
|---|---|---|---|
| D. 222,737 | 12/1971 | Scully | D26/140 |
| 3,603,952 | 9/1971 | Smith | 340/224 |
| 4,108,405 | 8/1978 | Gibson | 246/125 |
| 4,164,009 | 8/1979 | Maguire, Jr. et al. | 362/127 |
| 4,226,256 | 10/1980 | Hawley | 136/244 |
| 4,314,198 | 2/1982 | Rogers | 323/351 |
| 4,321,419 | 3/1982 | Hanafin | 136/251 |
| 4,327,316 | 4/1982 | Fujikubo et al. | 320/2 |

FOREIGN PATENT DOCUMENTS 54-153587  3/1979  Japan ................. 136/251

Primary Examiner—Aaron Weisstuch
Attorney, Agent, or Firm—Harness, Dickey & Pierce

[57] ABSTRACT

A solar power station for providing illumination or a signal generally including a storage battery-powered signaling element, a solar generator for recharging the storage battery and a bracket assembly for supporting the remainder of the components. The bracket assembly is lightweight and supports the solar generator in an orientation to provide adequate exposure to ambient light in a wide variety of sun positions. The signaling element is disposed substantially above the solar generator in order to minimize obstructions therebetween. The apparatus is adapted to be self-contained, to be independent in operation, and to be left unattended for substantial periods of time.

8 Claims, 4 Drawing Figures

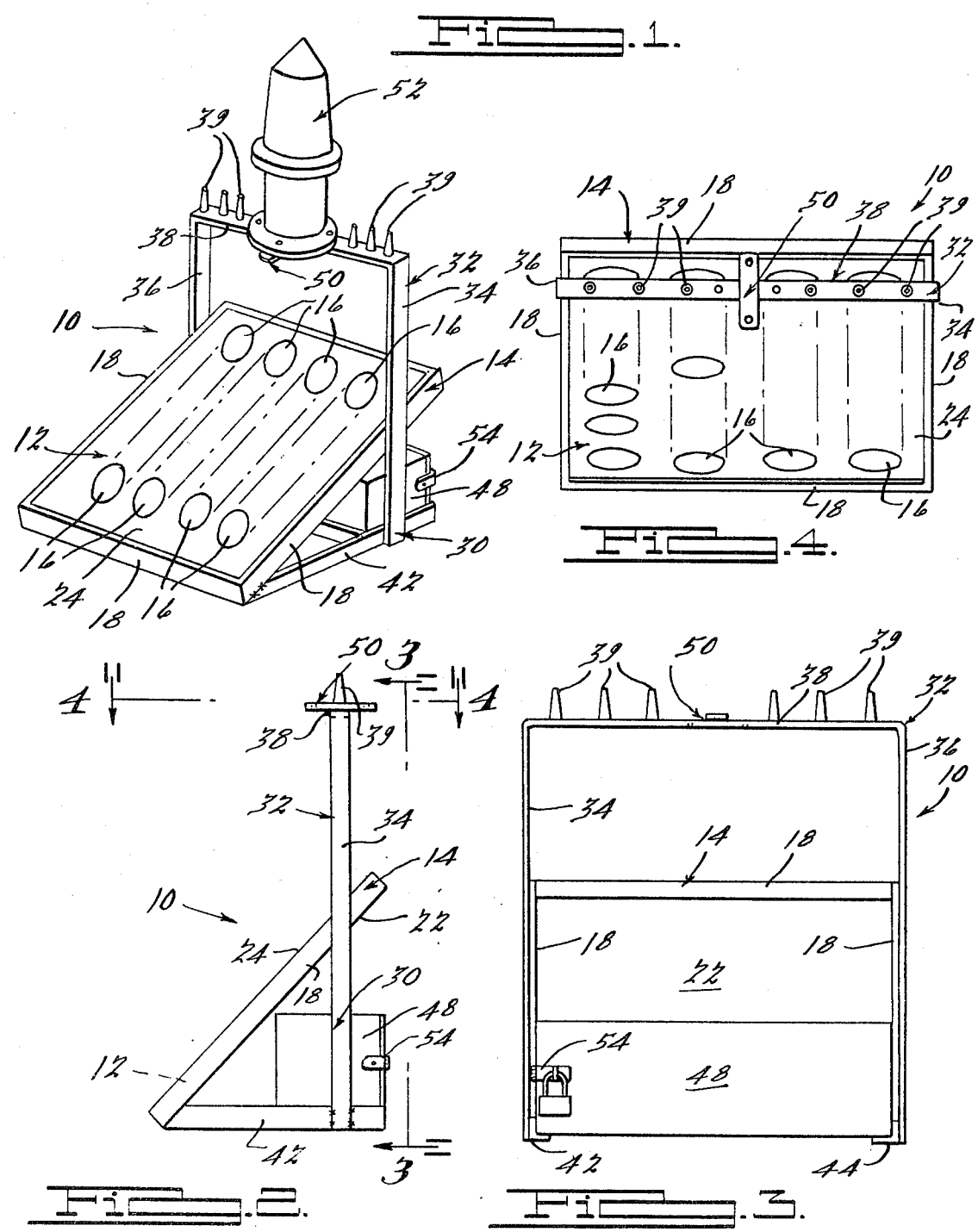

SOLAR POWER STATION

BACKGROUND AND SUMMARY OF THE INVENTION

The present invention relates generally to a solar power station, and more particularly to an independent lighting or signaling station having a battery-powered signaling element and a battery recharging system including one or more solar generators in a compact, self-contained arrangement.

Presently, battery-powered signal apparatus are utilized in isolated locations by the U.S. Navy, U.S. Coastguard, and others to provide warnings to persons using waterways or isolated land areas. Such signal apparatus may be used to indicate the presence of obstacles to indicate a passageway such as a channel or a particular pathway and may have a signal element in the form of a light, a radio beacon, a transponder or any other type of signaling device. The signal apparatus of the prior art are frequently relatively heavy in weight and difficult to transport. Furthermore, prior signal apparatus typically need constant or frequent monitoring such as for purposes of battery replacement.

The present invention provides a compact, self-contained signaling unit that is relatively light in weight compared to the above-described prior devices. The signaling apparatus includes at least one solar generator adapted for recharging a storage battery electrically connected to a signaling element such as an electric light or a radio beacon. The solar generator is preferably housed in an enclosure having a substantially transparent portion adapted to allow exposure of the generator's photoelectric cells or elements to ambient light. The preferred arrangement also includes a bracket or structural assembly that supports the solar generator in a relationship therewith such that the transparent portion faces generally upwardly and outwardly in order to maximize exposure of the photoelectric cells to ambient light. The generator may be disposed in a fixed relationship with the bracket for a specific geographic area or may be hinged and locked in various positions by pins or other locking means to be located at a position selected as optimum for a particular geographic area. The various elements of the unit are also preferably of a durable construction in order to minimize their susceptibility to natural or human destruction.

Additional advantages and features of the present invention will become apparent from the following description and the appended claims taken in conjunction with the accompanying drawings.

BRIEF DESCRIPTION OF THE DRAWINGS

FIG. 1 is an elevated perspective view of a solar power station of the present invention.

FIG. 2 is a side elevational view of the solar power station of FIG. 1 with the lantern removed.

FIG. 3 is a rear elevational view taken along line 3—3 of FIG. 2.

FIG. 4 is a top plan view taken along line 4—4 of FIG. 2.

DETAILED DESCRIPTION OF THE PREFERRED EMBODIMENTS

For purposes of illustration only, FIGS. 1 through 4 depict an exemplary solar power station adapted for use as an illuminating or signaling apparatus according to the present invention. One skilled in the art will readily recognize from the following discussion that the principles of the invention are equally applicable to solar power devices other than illuminating or signaling apparatus as well as to such apparatus other than that shown for illustration purposes in the drawings.

Referring to the drawings, a solar power station 10 generally comprises a solar generator assembly 12 having a housing or enclosure 14 which contains a plurality of photoelectric elements or cells 16, and a bracket assembly 30.

The enclosure 14 preferably includes a peripheral frame 18 generally surrounding the photoelectric cells 16, with spaced-apart inner and outer panels 22 and 24, respectively, disposed on opposite sides of the photoelectric cells of the solar generator. At least the outer panel 24 is at least substantially transparent and oriented at a preferred angle of approximately 45 degrees to a horizontal plane to face generally upwardly and outwardly in order to maximize the amount of ambient light passing therethrough to the solar battery cells.

The panels 22 and 24 are preferably composed of a lightweight, highly durable and substantially bulletproof synthetic material such as LEXAN plastic, for example. "LEXAN" is a trademark of General Electric Company for its thermoplastic carbonate polymer material. In such a case, the inner panel 22 may be composed of LEXAN material approximately ½ inch thick, and the outer panel 24 may be composed of approximately ¼ inch thick solar grade LEXAN material. One skilled in the art will readily recognize that panels of other materials and other thicknesses may alternatively be employed.

The solar generator assembly is mounted on a bracket assembly 30, which in the preferred embodiment has an upper bracket portion 32, which preferably includes a pair of generally upstanding legs 34 and 36 interconnected by a cross-member 38. The cross-member 38 may include bird spikes 39 as desired to discourage birds from polluting and obscuring the front panel 24 of the generator 12. A lower bracket portion 40 preferably includes a pair of base members 42 and 44.

The legs 34 and 36 of the upper bracket portion 32 are suitably secured, such as by fasteners or by welding, to their corresponding base members 42 and 44, respectively, in a generally right-angle relationship therewith. The enclosure 14 is suitably secured to the forward or outer ends of the base members 42 and 44 and to the upstanding legs 34 and 36, thereby facing generally upwardly and outwardly as discussed above. In the alternative, the enclosure 14 may be hinged by pins to the base members 42 and 44 to provide variability of angular position relative to the horizontal position of the base. The enclosure 14 is then angularly located in various positions, with the horizontal attachment means between the enclosure 14 and the legs 34 and 36 of the upper bracket portion 32 via a pin inserted into or threaded into the enclosure 14 via one of a set of holes in each of the legs 34 and 36, some type of pin and yoke arrangement between the legs 34 and 36 and the adjacent portion of the enclosure 14 or any other of various alternatives. The variable positioning permits the same solar power station to be utilized optimally at various latitudes in either the northern or southern hemispheres throughout the world.

Preferably, a storage battery box or enclosure 48 is secured in a similar manner to the rearward or inner ends of the base members 42 and 44 and cooperates with the base members and the solar generator enclosure 14 to define a generally rectangular base structure which supports the vertical upper bracket portion and the solar generator assembly in their orientations described above.

The upper bracket portion 32 further includes a mounting assembly 50 adapted for securing an electric light or lantern 52 thereto or other signaling device such as a radio beacon. The mounting assembly 50 is preferably disposed on the cross-member 38. The upstanding legs 34 and 36 are preferably of a height which permits the lantern 52 to be disposed substantially above the solar generator enclosure 14 to minimize the obstruction of ambient light striking the solar generator assembly and to maximize the visibility of the lantern 52.

The preferred storage battery box or enclosure 48 is adapted to provide a substantially weather-proof housing for a storage battery to prevent or minimize damage or corrosion from exposure to the elements. In this regard, the storage battery enclosure 48 is preferably located generally beneath the solar generator enclosure 14 in order to shelter the storage battery from the sun and rain. At least one portion of the storage battery enclosure 48 is hinged for insertion or removal of a storage battery and includes a lockable hasp or similar apparatus 54 in order to substantially prevent unauthorized access to the interior of the enclosure. The location and height of the battery enclosure 48 may change if a hinged version of the generator 12 is used so that adequate clearance between the generator enclosure 14 and the battery enclosure 48 can be maintained.

The entire bracket assembly 30 and the frame 18 are composed of suitable materials for outdoor applications and are preferably painted with a polycarbonate base paint for lasting wear in inclement weather settings. Other suitable weather-resistant paints, coatings or treatments may also be employed to protect the various components from the elements. If such components are composed of metal, such as steel, the weight of a typical solar power station constructed as shown in the drawing is approximately 80 pounds. These components may, however, be composed of high-strength, lightweight synthetic materials, such as polycarbonate plastic for example, and the total weight of the solar power station may be substantially reduced even further.

In use, the lantern 52 or other signaling device is secured to the mounting assembly 50 of the exemplary solar power station described above and shown in the drawings. A storage battery is installed in the storage battery enclosure 48 and is electrically connected to the lantern 52 by means of a wiring and control system which preferably includes a photoelectric on/off switch for the lantern. A lantern for use with the invention also preferably includes any of a number of known devices for lighting one or more redundant lamps therein in response to a failure of a primary lamp or lamps. The storage battery is also electrically connected to the solar generator, preferably through a control system adapted for regulating the recharging current supplied to the storage battery. The solar power station is then placed at its desired location and left unattended. As darkness falls, the lantern is automatically energized to generate a signal or provide illumination for passersby in the area.

It should be noted that because of the configuration and orientation of the above-described solar generator assembly, solar energy in the form of ambient light is used to recharge the storage battery under a very wide range of sun positions. In order to substantially ensure adequate electrical output, however, the preferred solar generator includes a number of photoelectric elements or cells substantially greater than that needed to recharge the storage battery under normally anticipated conditions. Thus, even if only part of the solar generator is directly exposed to ambient light, the solar generator will generate sufficient electrical output to recharge the storage battery.

The foregoing discussion discloses and describes merely exemplary embodiments of the present invention. One skilled in the art will readily recognize from such discussion that various changes, modifications and variations may be made therein without departing from the spirit and scope of the invention as defined in the following claims.

I claim:

1. In a self-contained signaling apparatus having an electrically-operable signal element and a storage battery for supplying electrical energy to said signal element, the improvement comprising in combination:

solar electric generator means connectable to said storage battery for converting ambient light to electrical energy and for recharging said battery, said solar electric generator means including a number of photoelectric cells electrically connected to said storage battery;

enclosure means for enclosing said solar generator means, said enclosure means including an outer panel portion composed of a substantially transparent material for allowing said ambient light to pass therethrough to said solar generator means; a bracket assembly for supporting said enclosure means in a relationship therewith such that said transparent upper portion faces in a generally upward and horizontally outward direction relative to said bracket assembly, said bracket assembly including mounting means adapted for mounting said signal apparatus thereon, said mounting means being positioned substantially above said solar generator means in order to substantially minimize the obstruction of said ambient light from striking said solar generator means and to maximize visibility of said signal apparatus, said bracket assembly further including a number of spike-like members protruding in a substantially upward direction therefrom in order to discourage birds or the like from perching on said bracket assembly; and means adapted for enclosing and attaching said storage battery to said bracket assembly.

2. The improvement according to claim 1, wherein said bracket assembly includes a first bracket portion and a second bracket portion, said first bracket portion including at least one generally vertically upstanding member, said second bracket portion including at least one generally horizontally extending member attached to said upstanding member, said enclosure means being attached to said first and second bracket portions in a generally transverse relationship therewith.

3. The improvement according to claim 1, wherein said enclosure means further includes a frame generally surrounding said solar generator means and an inner panel portion, said inner and outer panel portions being attached to said frame on opposite respective inner and outer sides of said photoelectric cells.

4. The improvement according to claim 1, further comprising a storage battery enclosure secured to said brcket assembly and being adapted for receiving said storage battery therein, said storage battery enclosure further being adapted to receive lock means thereon in order to substantially prevent unauthorized access to said storage battery.

5. The improvement according to claim 1, further comprising control means for regulating the recharging current supplied to said storage battery from said solar generator means.

6. A solar power station for a self-contained signaling apparatus having an electrically-operable signaling element powered by a storage battery, said solar power station comprising in combination:

a solar generator including a number of photoelectric cells electrically connected to said storage battery for converting ambient light to electrical energy in order to recharge said storage battery, the number of said photoelectric cells being substantially greater than that needed to recharge said storage battery in order to be capable of recharging said storage battery even while said solar generator is partially obstructed from the ambient light, enclosure means for enclosing said solar generator, said enclosure means including a peripheral frame generally surrounding said storage battery, inner and outer panels spaced apart on opposite sides of said solar generator and secured to said peripheral frame, at least said outer panel being substantially transparent in order to expose said photoelectric cells to said ambient light;

a bracket assembly including a first bracket portion and a second bracket portion, said first bracket portion including a pair of spaced-apart generally vertical upstanding legs interconnected at their upper ends by a generally horizontally extending crossmember, said peripheral frame of said enclosure means being secured to each of said upstanding legs at a location between their upper and lower ends, said second bracket portion including a pair of spaced-apart generally horizontally extending base members, each of said base members being secured to said peripheral frame of said enclosure means and to the lower end of one of said upstanding legs, said enclosure means for said solar generator being disposed at an approximately 45 degree angle relative to said generally horizontal base members, said horizontally extending cross-member having spike-like protruberances thereon, said spike-like protruberances protruding substantially upwardly from at least said cross-member in order to discourage birds or other animals from perching on said cross-member and thereby obstructing the incidence of ambient light onto said solar generator;

a housing adapted for receiving said storage battery therein, said housing being secured to at least one of said base members;

mounting means secured to said cross-member and being adapted for mounting said signaling element thereon said cross-member and said mounting means being disposed a substantial distance above said enclosure means in order to minimize the obstruction of ambient light by said first bracket portion and said signaling element;

means for electrically connecting said storage battery to said signaling element at predetermined times; and control means for regulating the recharging current supplied to said storage battery from said solar generator.

7. A solar power station according to claim 6, wherein said housing is secured to both of said base members and is disposed between said base members at a position generally beneath said enclosure means.

8. A solar power station according to claim 6, wherein said spaced-apart base members are secured to respective spaced-apart upstanding leg members at substantially right angles therewith.

* * * * *